United States Patent [19]

Sando et al.

[11] Patent Number: 4,533,147
[45] Date of Patent: Aug. 6, 1985

[54] AUTOMATIC PRESSURE CONTROL APPARATUS FOR AN END-FACE SEAL PLATE IN SEAL MECHANISM OF HIGH PRESSURE STEAMER

[75] Inventors: Yoshikazu Sando; Hiroshi Ishidoshiro, both of Wakayama, Japan

[73] Assignee: Sando Iron Works Co., Ltd., Wakayama, Japan

[21] Appl. No.: 634,116

[22] Filed: Jul. 24, 1984

[30] Foreign Application Priority Data

Jul. 26, 1983 [JP] Japan .......................... 58-115854[U]
Jul. 26, 1983 [JP] Japan .......................... 58-115855[U]

[51] Int. Cl.³ .............................................. F16J 15/54
[52] U.S. Cl. ...................................... 277/26; 277/12; 277/28; 277/DIG. 7; 277/70
[58] Field of Search ................. 38/49; 277/28, 29, 12, 277/32, 237, DIG. 7, DIG. 8, 15, 26, 70

[56] References Cited

U.S. PATENT DOCUMENTS

| | | | |
|---|---|---|---|
| 3,158,507 | 11/1964 | Alexander | 277/DIG. 7 X |
| 3,367,667 | 2/1968 | Allen | 277/DIG. 7 X |
| 3,573,875 | 4/1971 | Zuczek | 277/DIG. 7 X |
| 4,261,586 | 4/1981 | Sando et al. | 277/DIG. 7 X |

*Primary Examiner*—Robert S. Ward
*Attorney, Agent, or Firm*—Wenderoth, Lind & Ponack

[57] ABSTRACT

An automatic pressure control apparatus for an end-face seal plate in a seal mechanism of a high pressure steamer for wet-heat treatment of a textile product comprising; a seal mechanism having a pair of seal rubber rolls located above a hole in the high pressure steamer body, through which the cloth is passed for the purpose of sealing said hole, a seal block for supporting the seal rubber rolls which are freely rotatable, an end-face seal plate supported by the seal block, in pressure contact with the seal rubber rolls and the end face of the seal block so as to be freely slidable in the axial direction of the seal rubber rolls, an end-face seal plate support fitting for support of the end-face seal plate, a pressure control screw supported by means of a support fitting fixed to the seal block so as to be freely slidable in the axial direction of the seal rubber rolls, and a press-down plate movable in the axial direction of the seal rubber rolls by means of the pressure control screw, a pressure detector provided between the press-down plate and the end face of the seal rubber rolls for detecting the contact pressure between the end faces of the seal rubber rolls and the end-face seal plate, and an operation mechanism driven by means of a pressurized fluid to move said pressure control screw back and forth, thus allowing the end faces of the seal rubber rolls to make contact with the end-face seal plate under an appropriate amount of pressure, and a modification thereof.

2 Claims, 4 Drawing Figures

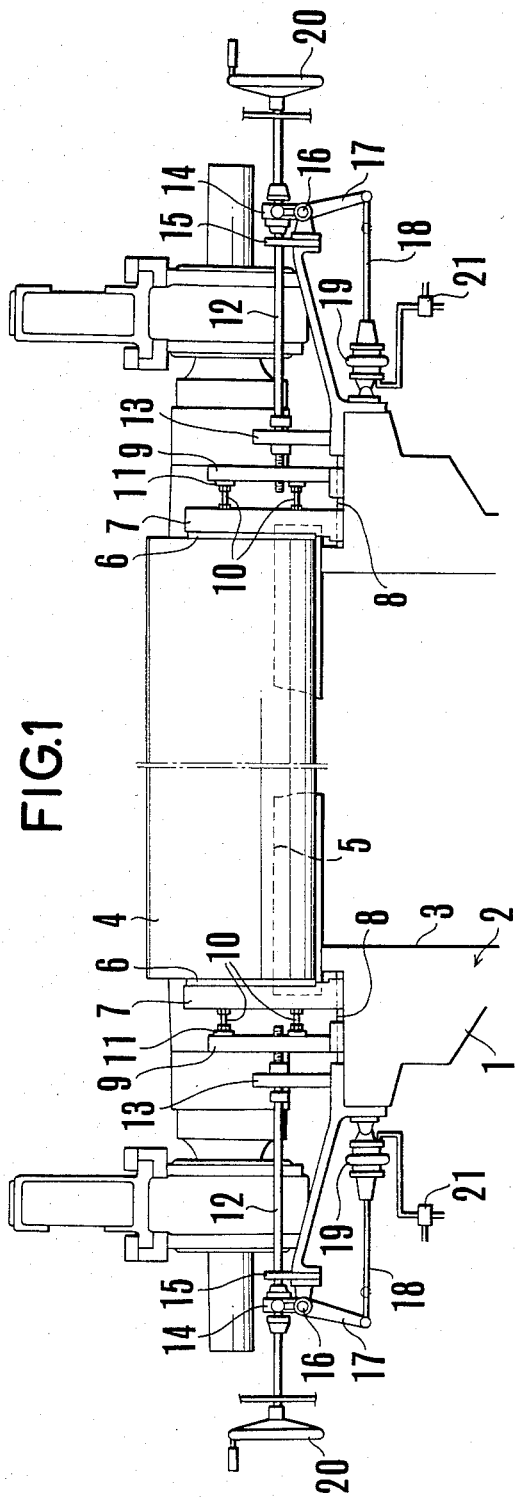
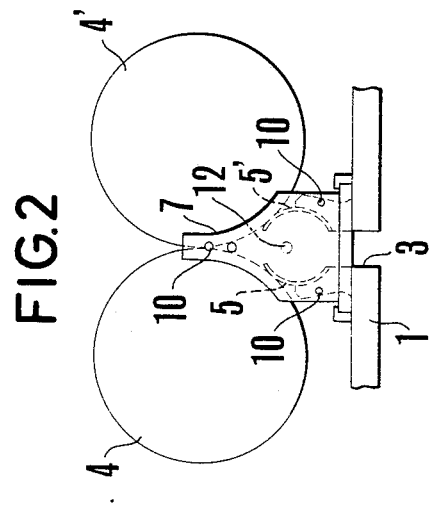

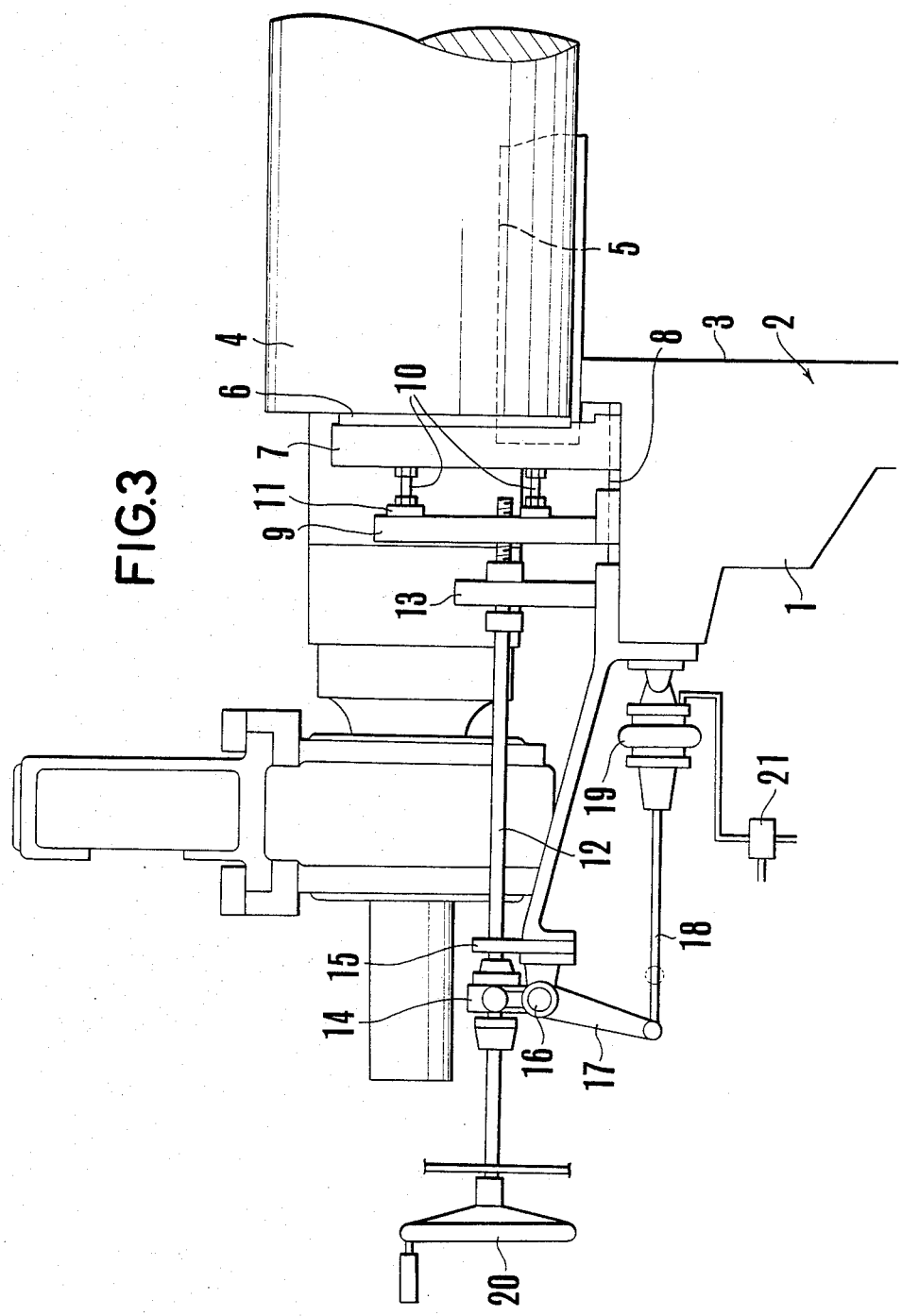

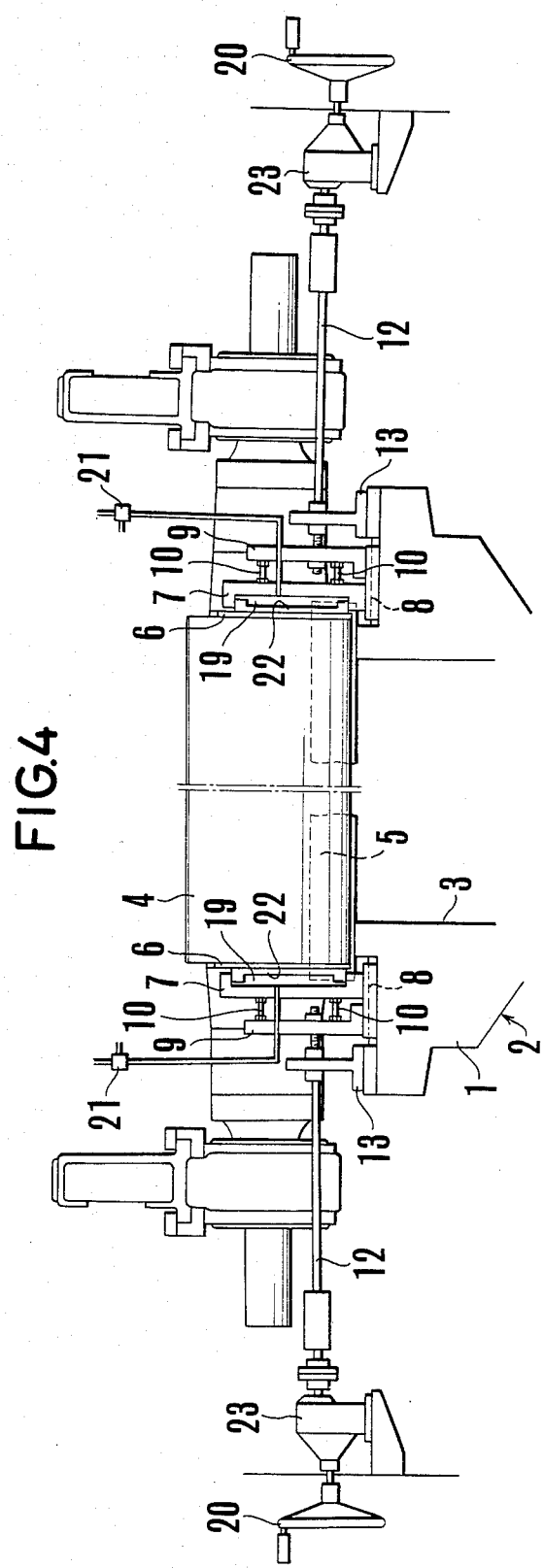

AUTOMATIC PRESSURE CONTROL APPARATUS FOR AN END-FACE SEAL PLATE IN SEAL MECHANISM OF HIGH PRESSURE STEAMER

BACKGROUND OF THE INVENTION

1. Field of the Invention

The present invention relates to an automatic pressure control for an end-face seal plate in seal mechanism of a high pressure steamer for wet-heat treatment of a textile product, in which the end-face seal plate is controlled automatically in accordance with the thermal expansion of seal rolls, incorporated in the seal mechanism, in order to create a constant sealing effect with a prescribed amount of pressure.

2. Description of the Prior Arts

A known seal mechanism for a high pressure steamer comprises an end-face seal plate for sealing the openings formed by a pair of seal rolls, their end-faces and the end face of a seal frame. For the purpose of making a close contact of said end-face seal plate with the end faces of the seal roll and the seal frame effectively, the present invention offers an automatic pressure control apparatus for the end-face seal plate. This apparatus enables the end-face seal plate and the end faces of the seal rolls and the seal frame to have close contact to each other automatically and effectively in accordance with the thermal expansion of the seal rolls incorporated in the seal mechanism. These seal rolls and the seal frame attached to the seal mechanism are heated to a tolerable degree in service so as to cause thermal expansion of the seal rolls and the seal frame. If the end-face seal plate is arranged closely in contact with the end faces of the seal rolls and the seal frame before putting in service, the operation becomes impossible due to an abnormal friction force caused by thermal expansion during the operation, but if a gap is provided previously between these fittings in anticipation of expansion, the pressure in the interior of the steamer body can hardly be raised to a prescribed value and needs a long period of time before it can reach a normal operation state.

To solve such drawbacks as the above-mentioned, the present inventors have recently proposed a seal mechanism comprising a pair of seal rubber rolls arranged above a hole of the high pressure steamer body through which the cloth is passed for the purpose of sealing the hole, seal frames for supporting these rolls to be freely rotatable, and an end-face seal plate pressedly in contact with the end faces of the seal rubber rolls and the seal frame; an automatic pressure control apparatus for the end-face seal plate comprising a press-down rod for causing the pressed contact of said end-face seal plate with the end-faces of the seal rubber rolls and the seal frame, a pressure responsive mechanism to push the press-down rod in the direction forward the end faces of the seal rubber rolls and the seal frame in cooperation with the inner pressure of the high pressure steamer body, and a plurality of springs for pressing down the end-face seal plate to the end faces of the seal rubber rolls and the seal frame with an appropriate pressure in case the pressure responsive mechanism is non-operative. In this apparatus, since the end-face seal plate is moved due to the inner pressure of the steamer body, the contact pressure between the seal rubber rolls and the end-face seal plate is elevated, as the inner pressure of the steamer body increases. On the other hand, the immediate reason for the change in the contact pressure between the seal rubber rolls and the seal end-face plate in the course of operation of a high pressure steamer is the thermal expansion of the seal rubber roll and the end-face seal plate. Accordingly, even when the pressure of the steamer body is increased, the contact pressure between the seal rubber rolls and the seal end-face plate becomes insufficient in a case where the degree of thermal expansion of the seal rubber rolls and the end-face seal plate is small, thus causing the problem of pressure leakage.

SUMMARY OF THE INVENTION

To resolve the above-mentioned problems, the object of the present invention is to offer an improved apparatus for automatic pressure control of the end-face seal plate in the seal mechanism of a high pressure steamer for the wet-heat treatment process of a textile product.

The essential point of the inventive apparatus comprises: a seal mechanism having a pair of seal rubber rolls located above the hole, through which the cloth is passed, of a high pressure steamer body, for the purpose of sealing the hole, a seal block for supporting the seal rubber rolls which are freely rotatable, an end-face seal plate supported by the seal block and in contact pressure with the seal rubber rolls and the end face of the seal block so as to be freely slidable in the axial direction of the seal rubber rolls, an end-face seal plate support fitting for support of the end-face seal plate, a pressure control screw supported by means of a support fitting fixed to the seal block so as to be freely slidable in the axial direction of the seal rubber rolls, and a press-down plate movable in the axial direction of the seal rubber rolls by means of the pressure control screw, a pressure detector provided between the press-down plate and the end faces of the seal rubber rolls for detecting the contact pressure between the end face of the seal rubber rolls and the end-face seal plate, and an operation mechanism driven by means of a pressurized fluid so that the pressure control screw can be moved back and forth thus allowing contacting the end faces of the seal rubber rolls to make contact with the end-face seal plate under an appropriate amount of pressure; and a modification thereof.

BRIEF EXPLANATION OF THE DRAWINGS

The drawings are to show examples of the present apparatus for automatic pressure control of the end-face seal plate in the seal mechanism of a high pressure steamer.

FIG. 1 is a sectional side view of an example of the apparatus,

FIG. 2 is a front view thereof and

FIG. 3 is an enlarged side view of the essential parts thereof.

FIG. 4 is a sectional side view of another example of the apparatus.

DETAILED DESCRIPTION OF THE INVENTION

The present invention will be explained in detail in the following paragraphs with reference to the drawings which show examples of the inventive apparatus.

An example of the apparatus shown in FIGS. 1 to 3, 1 is a seal block provided on a high pressure steamer 2, and a hole 3, for the purpose of passing a cloth therethrough, is provided through the seal block 1. Above the hole 3, a pair of seal rubber rolls 4 and 4', being in contact pressure with each other, are provided in a freely rotatable manner. To seal the gap formed between the pair of seal rubber rolls 4, 4' and the edge of the upper opening of the hole 3 through which the cloth is passed, a pair of seal plates 5, 5', being a hemicycle shape in section, are fixed to the seal block 1. 6 is an end-face seal plate for sealing a mountain-shaped gap formed between the end faces of said pair of seal rubber rolls 4, 4' and the seal block 1, and 7 is a support fitting for the end-face seal plate 6. This support fitting 7 is supported by a guide fitting 8 attached to the seal block 1 and is freely slidable in the direction parallel to the axes of the seal rubber rolls 4, 4'.

9 is a press-down plate used to press down the end-face seal plate support fitting 7 by putting three gap control bars 10 and a pressure detector 11. The front end of a pressure control screw 12 is screwed into the backside of the press-down plate 9. 13 is a support fitting fixed to the side face of the seal block 1, in order to support the pressure control screw 12. 14 is a stop ring which is stoppable in the axial direction of the pressure control screw but is not stoppable in the rotation direction thereof. 16 is a support shaft supported by a support fitting 15 integrated with the seal block 1, and the stop ring 14 is pivotably supported by one end of an arm 17 swingably supported by the support shaft 16. The other end of the arm 17 is connected to the front end of a rod 18. 19 is an air-tight chamber situated between the tail end of the rod 18 and the seal block 1 thus enabling the rod 18 to move back and forth in accordance with the pressure in the air-tight chamber 19. This air-tight chamber 19 may be one such as an air cylinder or a diaphragm. 20 is a handle attached to the pressure control screw 12 en bloc, and 21 is an electromagnetic valve for supplying air to the air-tight chamber 19 in accordance with the pressure in the pressure detector 11.

The function of this example will be described hereinbelow.

Firstly, at the time when the seal rubber rolls 4, 4' are not expanded, the pressure contact between the end faces of the seal rubber rolls 4, 4' and the end-face seal plate 6 is controlled by the operation of the handle 20 so that they are just in contact with each other. When the temperature of the steamer body 2 is elevated during operation, upto about 150° C., for instance, the seal rubber rolls 4, 4' are expanded due to heat, and accordingly the end-face seal plate 6 and the end-face seal plate support fitting 7 are pressed outwards in the axial direction of the seal rubber rolls 4, 4'. Then, the pressing force of the end-face seal plate 6 and the end-face seal plate support fitting 7 acts on the pressure detector 11. An electrical output of the pressure detector 11 corresponding to the pressure applied thereto, opens and shuts the electromagnetic valve 21 which is used in controlling the amount of air supplied into the air-tight chamber 19. That is to say, when the pressure acting on the pressure detector 11 becomes higher than the prescribed value, the pressure in the air-tight chamber 19 decreases due to the action of the electromagnetic valve 21, and the pressure contact between the end-face seal plate 6 and the seal rubber rolls 4, 4' is weakened due to the automatic action of the pressure control screw 12, therefore allowing the seal rubber rolls 4, 4' to operate smoothly by the prevention of an inner pressure leakage of the steamer body 2. On the other hand, when the pressure in the pressure detector 11 decreases below the prescribed value, pressurized air is supplied into the air-tight chamber 19 by the operation of the electromagnetic valve 21, caused by the electrical output from the pressure detector 11, and the contact pressure between the end-face seal plate 6 and the seal rubber rolls 4, 4' is then strengthened due to the automatic effect of the pressure control valve 12 so that the seal rubber rolls 4, 4' can also be smoothly rotated with the prevention of an inner pressure leakage of the steamer body 2.

Another example of the present inventive apparatus is shown in FIG. 4. The constructional elements from a seal block 1 to a guide fitting 8 in this example are the same as in the preceding example. 9 is a press-down plate pressing on the end-face seal plate support fitting 7 by placing three gap control bars 10 therebetween, with the front end of a pressure control screw 12 screwed to the backside of the press-down plate 9. Supporting the pressure control screw 12 is a support fitting 13 which is fixed to the side face of the seal block 1 as in the preceding example. An air-tight chamber 19 is attached to the end-face seal plate 6 in this instance by placing a pushing body 22 therebetween, which is used to push the end-face seal plate 6 in a case when the inner pressure of the air-tight chamber 19 is increased. Further, a pressure detector (not shown in the drawing) is attached to the air-tight chamber 19 in the direction of the end-face of the seal rubber rolls 4, 4'. 21 is an electromagnetic valve which acts in response to the signal from the pressure detector thus maintaining the pressure in the air-tight chamber to a prescribed value. 20 is a handle for rotating the pressure control screw 12 via a reduction gear 23.

Also, in this example of the present inventive apparatus, when the temperature of the steamer body is elevated during operation, the seal rubber rolls 4, 4' expand due to heat, and the end-face seal plate 6 and the end-face seal plate support fitting 7 are pressed in the axial direction of the seal rubber rolls 4, 4'. Then, the pushing body 22 is pushed against the pressure of the air-tight chamber 19, and accordingly the pressure in the air-tight chamber 19 is elevated. The pressure increase in the air-tight chamber 19 is detected by means of a pressure detector (not shown in the drawing), the electromagnetic valve 21 is operated, and the pressure of air supplied into the air-tight chamber 19 can be controlled. Therefore, the seal rubber rolls 4, 4' operate smoothly with the prevention of an inner pressure leakage of the steamer body 2.

As described in the above, with the use of the present inventive apparatus, it is possible to control the contact pressure between the seal rubber rolls and the end-face seal plate in the seal mechanism of a high pressure steamer automatically so that the rubber seal rolls can operate smoothly while preventing a leakage of the inner pressure from the steamer body.

What we claim:

1. An automatic pressure control apparatus for an end-face seal plate in a seal mechanism of a high pressure steamer for wet-heat treatment of a textile product comprising: a seal mechanism, having a pair of seal rubber rolls located above a hole of the high pressure steamer body, through which a cloth is passed, for the purpose of sealing said hole, a seal block for supporting the seal rubber rolls which are freely rotatable, an end-face seal plate supported by the seal block and in pressure contact with the seal rubber rolls and the end face of the seal block so as to be freely slidable in the axial direction of the seal rubber rolls, an end-face seal plate support fitting for support of the end-face seal plate, a pressure control screw supported by means of a support fitting fixed to the seal block so as to be freely slidable in the axial direction of the seal rubber rolls, and a press-down plate movable in the axial direction of the seal rubber rolls by means of the pressure control screw, a pressure detector provided between said press-down plate and the end face of the seal rubber rolls for detecting the contact pressure between the end faces of the seal rubber rolls and the end-face seal plate, and an operation mechanism driven by means of a pressurized fluid so as to move said pressure control screw back and forth, thus allowing the end faces of the seal rubber rolls to make contact with the end-face seal plate under an appropriate amount of pressure.

2. An automatic pressure control apparatus for an end-face seal plate in a seal mechanism of a high pressure steamer for wet-heat treatment of a textile product comprising; a seal mechanism having a pair of seal rubber rolls located above a hole of the high pressure steamer body, through which a cloth is passed, for the purpose of sealing said hole, a seal block for supporting the seal rubber rolls which are freely rotatable, an end-face seal plate supported by the seal block and in pressure contact with the seal rubber rolls and the end face of the seal block so as to be freely slidable in the axial direction of the seal rubber rolls, an end-face seal plate support fitting for support of the end-face seal plate, a pressure control screw supported by means of a support fitting fixed to the seal block so as to be freely slidable in the axial direction of the seal rubber rolls, and a press-down plate movable in the axial direction of the seal rubber rolls by means of the pressure control screw; an air-tight chamber provided between the end-face seal plate and the end-face seal plate support fitting, a pushing body for pushing the end-face seal plate to the end face of the seal rubber rolls by means of a pressurized fluid supplied into the air-tight chamber, a pressure detector for detecting the inner pressure of the air-tight chamber, and a pressure control mechanism for controlling the pressure in the interior of the air-tight chamber at a prescribed value by means of the pressure detecting signal.

* * * * *